United States Patent
Westover

(10) Patent No.: US 12,103,533 B2
(45) Date of Patent: Oct. 1, 2024

(54) SYSTEMS AND METHODS FOR VARIABLE ENERGY REGENERATION CRUISE CONTROL

(71) Applicant: TOYOTA MOTOR ENGINEERING & MANUFACTURING NORTH AMERICA, INC., Plano, TX (US)

(72) Inventor: Nathan C. Westover, New Hudson, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 270 days.

(21) Appl. No.: 17/462,636

(22) Filed: Aug. 31, 2021

(65) Prior Publication Data
US 2023/0067494 A1    Mar. 2, 2023

(51) Int. Cl.
 *B60W 30/18* (2012.01)
 *B60W 30/16* (2020.01)

(52) U.S. Cl.
 CPC ...... *B60W 30/18127* (2013.01); *B60W 30/16* (2013.01); *B60W 2510/244* (2013.01); *B60W 2554/406* (2020.02)

(58) Field of Classification Search
 CPC ..... B60L 3/0046; B60W 10/06; B60W 10/08; B60W 10/26; B60W 20/00; B60W 20/12;
 (Continued)

(56) References Cited

U.S. PATENT DOCUMENTS 8,855,844 B2    10/2014   Schwindt
2011/0015812 A1*  1/2011   Vogel ............... B60W 30/143
                                               701/22
(Continued)

FOREIGN PATENT DOCUMENTS

CN    104648374 B    10/2017
CN    109367537 A     2/2019
(Continued)

OTHER PUBLICATIONS

Study on adaptive cruise control strategy for battery electric vehicle (https://www.hindawi.com/journals/mpe/2019/7971594/), Dec. 10, 2019, 15 pages.

Primary Examiner — Peter D Nolan
Assistant Examiner — Ce Li Li
(74) Attorney, Agent, or Firm — SHEPPARD, MULLIN, RICHTER & HAMPTON LLP; Daniel N. Yannuzzi

(57) ABSTRACT

Systems and methods are provided for implementing variable energy regeneration cruise control, which involves dynamically increasing a limit of allowed energy regeneration in order to meet the deceleration need of the vehicle. The system and techniques leverage variable energy regeneration to allow for the additional energy resulting from deceleration to be stored (e.g., in a vehicle battery) for further use rather than being lost. Consequently, by ultimately providing additional stored energy, the disclosed variable energy regeneration cruise control system can realize advantages over conventional cruise control systems. A system can be programmed to dynamically adjust an amount of regenerative energy for decelerating a vehicle while a cruise control is activated. A regenerative braking system can decelerate the vehicle and store an amount of captured energy based on the amount of adjusted regenerative energy.

12 Claims, 4 Drawing Sheets

(58) Field of Classification Search
CPC .......... B60W 20/14; B60W 2510/244; B60W 2520/10; B60W 2552/20; B60W 2552/30; B60W 2554/406; B60W 2556/50; B60W 30/143; B60W 30/16; B60W 30/18127; B60W 30/20; B60W 40/076; B60W 50/0097

See application file for complete search history.

(56) References Cited

U.S. PATENT DOCUMENTS

| | | | |
|---|---|---|---|
| 2013/0204472 A1* | 8/2013 | Pfefferl | B60W 20/00 701/22 |
| 2014/0114514 A1* | 4/2014 | Crombez | B60W 20/13 903/930 |
| 2014/0121870 A1 | 5/2014 | Lee | |
| 2016/0144721 A1* | 5/2016 | Soo | B60L 7/26 180/65.25 |
| 2016/0167641 A1* | 6/2016 | Yoon | G08G 1/09623 903/903 |
| 2016/0244044 A1* | 8/2016 | Miller | B60W 50/0097 |
| 2018/0362015 A1* | 12/2018 | Yui | B60K 6/442 |
| 2019/0283624 A1* | 9/2019 | Nakao | B60L 58/13 |
| 2022/0009490 A1* | 1/2022 | Petisme | B60L 7/18 |

FOREIGN PATENT DOCUMENTS

| | | | |
|---|---|---|---|
| JP | 6730656 B2 | 7/2020 | |
| KR | 100906870 B1 | 7/2009 | |
| KR | 20170057769 A | 5/2017 | |
| KR | 101977416 B1 | 5/2019 | |

* cited by examiner

SYSTEMS AND METHODS FOR VARIABLE ENERGY REGENERATION CRUISE CONTROL

TECHNICAL FIELD

The present disclosure relates generally to a system and techniques for employing energy regeneration in Dynamic Radar Cruise Control systems. In particular, adjusting an amount of energy regeneration can be used to achieve a desired amount of deceleration for dynamic radar cruise control used in vehicle systems.

DESCRIPTION OF RELATED ART

Dynamic Radar Cruise Control (DRCC) functions similarly to conventional constant speed cruise control in that it controls a vehicle such that it travels at a consistent speed that is set by the driver. However, DRCC adds a vehicle-to-vehicle distance control mode that is not provided by many constant speed cruise control systems. The vehicle-to-vehicle distance control allows a driver to maintain a preset vehicle-to-vehicle distance to a preceding vehicle. DRCC can be a complicated mixture of customer needs versus ideal performance, both of which may greatly impact a vehicle's performance related features, such as vehicle fuel economy.

Once a desired vehicle speed is set by the driver, DRCC uses vehicle sensors, such as a millimeter-wave radar and a forward-facing camera, to detect surrounding vehicles (e.g., including vehicles that are in front of the driven vehicle) on the road, and determine their distance away from the driver's vehicle. Accordingly, in order to maintain the preset vehicle-to-vehicle distance away from the preceding vehicle, the DRCC system is also designed to automatically adjust the speed of the driven vehicle. For instance, the DRCC can automatically reduce a vehicle's speed when the proceeding vehicle is traveling at a lower speed.

BRIEF SUMMARY OF THE DISCLOSURE

In accordance with an embodiment of the disclosed technology a system and method for variable energy regeneration for Dynamic Radar Cruise Control (DRCC) is described. The DRCC, as disclosed herein, is enhanced by utilizing an expanded energy regeneration instead of mechanical breaking during operation.

In accordance with an embodiment of the disclosed technology a variable energy regeneration cruise control system can comprise a cruise control system and a regenerative braking system. The cruise control system can be programmed to dynamically adjust an amount of regenerative energy for decelerating a vehicle while a cruise control is activated. The regenerative braking system can decelerate the vehicle and store an amount of captured energy based on the amount of adjusted regenerative energy.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Currently, the control logic for existing DRCC systems are designed to employ mechanical brakes when automatically adjusting a vehicle's speed, for instance when speed reduction beyond the vehicle road load (e.g., coasting speed decrease) is necessary. Nonetheless, there are several drawbacks related to mechanical braking. For example, energy can be lost in the form of heat and/or vibration through friction when mechanical brakes are engaged. The disclosed embodiments particularly configure the DRCC's control logic to utilize variable energy regeneration cruise control (also referred to herein as regenerative braking), as opposed to mechanical brakes. Variable energy regeneration cruise control can involve dynamically increasing a limit of allowed energy regeneration in order to meet the deceleration need of the vehicle. Leveraging variable energy regeneration in this manner allows for the additional energy resulting from deceleration to be stored (e.g., in a vehicle battery) for further use rather than being lost. Consequently, by ultimately providing additional stored energy, the disclosed variable energy regeneration cruise control system can realize advantages over current conventional cruise control systems and many existing DRCC systems, such as improved fuel economy, improved drivability, and extended brake life.

Figure 1:
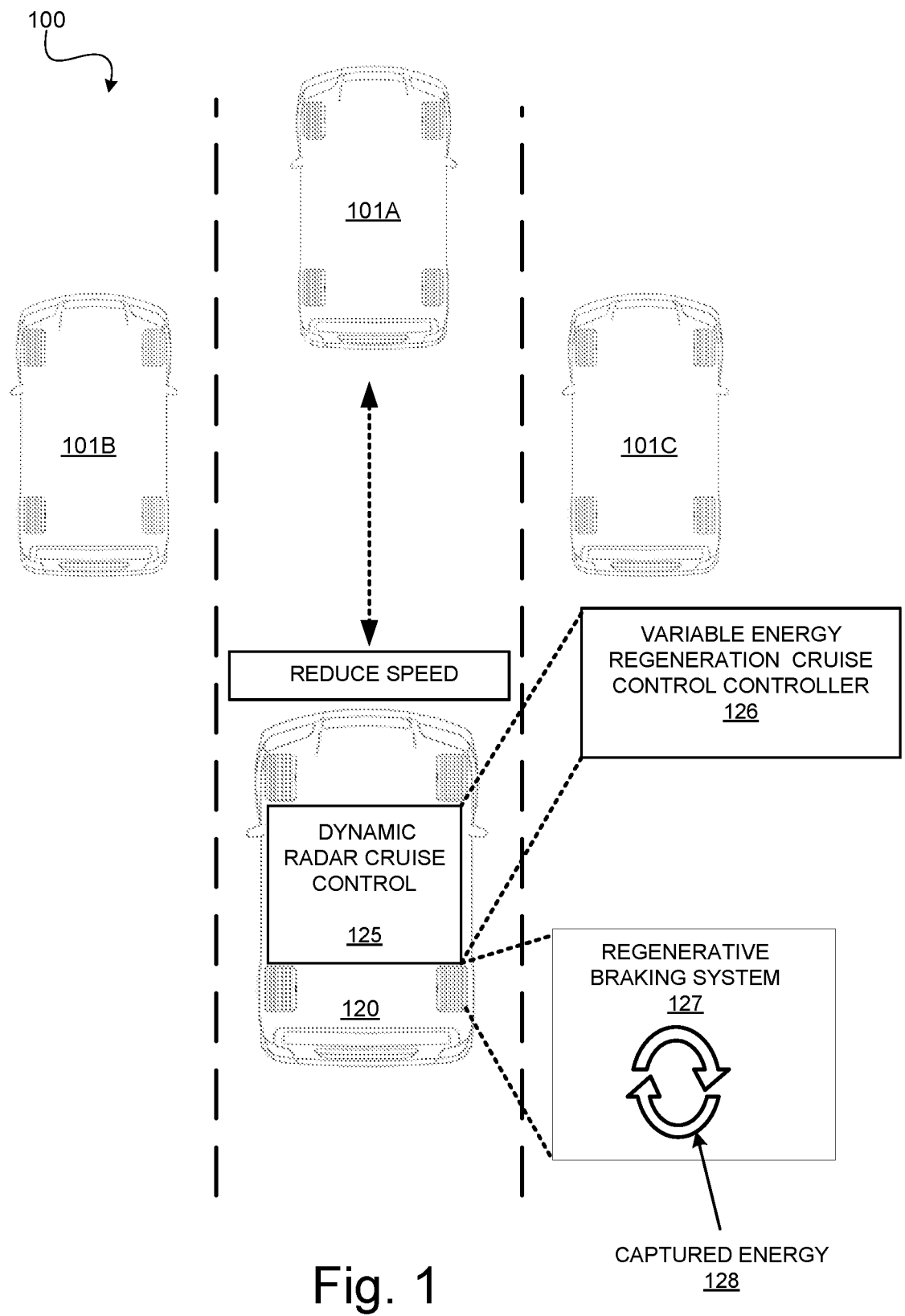
FIG. 1 is an example environment in which variable energy regeneration cruise control can be implemented in an vehicle as a component of Dynamic Radar Cruise Control (DRCC) for example, in accordance with an embodiment of the technology disclosed herein.

FIG. 1 illustrates an example environment 100 in which a vehicle, shown as vehicle 120 for example, implements variable energy regeneration cruise control. According to the embodiments, the vehicle 120 is a hybrid vehicle having the capability of variable, or dynamically adjustable, energy regeneration. In the example of FIG. 1, a variable energy regeneration cruise control controller 126 can be implemented as a component of a Dynamic Radar Cruise Control (DRCC) 125 for vehicle's 120, where the variable energy regeneration cruise control controller 126 is particularly configured to perform the variable energy regeneration aspects disclosed herein. As referred to herein, the DRCC 125 controls vehicle 120 to automatically travel at a preset speed. Further, the DRCC 125 performs vehicle-to-vehicle distance control, which controls vehicle 120 to automatically maintain a preset vehicle-to-vehicle distance from a preceding vehicle. In some cases a user, such as a driver of vehicle 120, determines and enters the preset speed and the present vehicle-to-vehicle distance to be used by the DRCC 125.

The example environment 100 illustrates a real-world application for variable energy regeneration cruise control that is related to motorized vehicles, shown particularly as automobiles in FIG. 1. As alluded to above, vehicle 120 in the environment 100 has the capability to be autonomously or semi-autonomously driven, such that the functions of cruise control implemented by the DRCC 125 are appropriately supported (e.g., autonomous acceleration, autonomous deceleration, etc.). In the example, the DRCC 125 can cause automatic maneuvering, or automatic drive-control, of vehicle 120 in a manner that is principally focused to drive at the preset speed and the present vehicle-to-vehicle distance from a leading vehicle, shown as vehicle 101A, when vehicle 120 set to a cruise control mode. during operation in its current environment 100, which is illustrated in FIG. 1. Restated, the DRCC 125 can implement the disclosed variable energy regeneration cruise control techniques in semi-autonomous (e.g., partially computer-controlled) or fully autonomous operations for a vehicle. Although the able energy regeneration cruise control techniques are described herein in relation to automobiles, for purposes of illustration, it should be appreciated that these techniques are applicable to various forms of motorized vehicles that may leverage cruise control functionality, such as trucks, boats, motorcycles, automobiles, recreational vehicles and other like on-or off-road vehicles and the like. As used herein, a "vehicle" is any form of motorized transport.

FIG. 1 generally illustrates the vehicle 120 traveling on a roadway, where vehicle 120 is shown to include the DRCC 125 having a variable regeneration cruise control controller 126. As seen, other vehicles 101A-101C may be currently sharing the roadway, being proximately located to vehicle 120. In particular, vehicle 101A is illustrated as directly in front of, or preceding, vehicle 120 in the same lane. Thus, vehicle 101A is referred to as a lead vehicle, regarding its position with respect to vehicle 120. As vehicle 120 is being driven down the roadway, the driver of vehicle 120 can activate a cruise control mode at a preset vehicle speed of 55 MPH, for example. Accordingly, while in cruise control mode, the DRCC 125 can activate one or more automatic actions of vehicle 120, such as dynamically accelerating (e.g., uphill) and dynamically decelerating (e.g., downhill) to ensure that the speed of vehicle 120 is maintained at the preset vehicle speed of 55 MPH despite the terrain and/or road conditions. In some implementations, the DRCC 125 is configured to automatically adjust the vehicle's 120 between a determined range of speeds. As an example, cruise control can be set at any vehicle speed within the range of approximately 25 to 110 MPH. In other words, if the lowest set speed for cruise control is 28 MPH, a vehicle speed must be above approximately 28 mph to select the cruise control mode and initiate the DRCC 125. Once the preset vehicle speed is set by the driver, the DRCC 126 can use a millimeter-wave radar and a forward-facing camera to detect any vehicles that are front of vehicle 120, namely lead vehicle 101A in FIG. 1, and help determine their distance away from each other.

Furthermore, while in cruise control mode, the DRCC 125 is capable of controlling vehicle 120 for vehicle-to-vehicle distance control. For example, the DRCC 125 can control vehicle 120 to follow the lead vehicle 101A in order to maintain a preset vehicle-to-vehicle distance of 80 feet away from the lead vehicle 101A. That is, the DRCC 125 is configured to automatically respond to changes in the speed of the vehicle ahead, or lead vehicle 101A in FIG. 1, in order to help maintain the preset vehicle-to-vehicle distance set by the driver or return to the preset vehicle speed once the road ahead is clear. As alluded to above, the preset vehicle-to-vehicle distance can be set by the driver. For example, the driver can interact with a vehicle input, such as pressing a button, which allows the driver to choose from multiple vehicle-to-vehicle distance settings. In order to follow lead vehicle 101A at the present vehicle-to-vehicle distance, while the lead vehicle 101A travels at a wide range of speeds (e.g., stop and go traffic, freeway speeds, etc.) occasionally the vehicle 120 may need to dynamically adjust its speed, in order stay at an 80 foot distance from the lead vehicle 101A. As an example, the lead vehicle 101A may be moving at a slower speed than vehicle 120, thus the DRCC 125 may need to automatically slow down (shown in FIG. 1 as "slow down"), or decelerate, vehicle 120 to keep the preset vehicle-to-vehicle distance from vehicle 101A. The DRCC 125 may detect that the vehicle ahead, namely lead vehicle 101A, is traveling at 35 MPH, which is speed slower than the preset vehicle speed for the cruise control mode of 55 MPH in the example. In another example, the DRCC 125 may detect that the lead vehicle 101A is closer than the preset vehicle-to-vehicle distance of the control range setting. Referring back to previous example, the DRCC 125 may detect that the lead vehicle is at a distance of 60 feet away from vehicle 120. Because lead vehicle 101A is determined to be too close (not a safe distance), or at a distance lesser than the preset vehicle-to-vehicle distance selected by the driver, the DRCC 125 is designed to automatically decelerate vehicle 120 (shown as "slow down' in FIG. 1) without having to cancel the cruise control. In some embodiments, when there is no longer a preceding vehicle driving slower than your vehicle's set speed, for instance lead vehicle 101 speeds up, the DRCC 125 can cause the vehicle 120 to automatically accelerate until the preset vehicle speed for cruise control is reached and returns to constant speed cruising. When a reduction in vehicle speed is necessary while in cruise control mode, the DRCC 125 may trigger regenerative braking as a mechanism to decelerate the vehicle 120.

Hybrid vehicles, such as vehicle 120, have the unique ability to apply regenerative braking, and further to adjust the amount of energy regeneration that is enabled during these braking events. As referred to herein, regenerative braking is a type of kinetic energy recovery system that transfers the kinetic energy of an object in motion into potential or stored energy to slow the vehicle down, and as a result increases fuel efficiency. There are multiple methods of energy conversion utilized to implement regenerative braking, including spring, flywheel, electromagnetic and hydraulic. However, most existing cruise control systems, even in hybrid vehicles, do not fully leverage regenerative braking. For instance, even if a hybrid vehicle initially uses regenerative braking while in cruise control mode, an existing cruise control system will switch from regenerative braking and use mechanical friction brakes after a standard threshold of energy regeneration is met. In contrast, the DRCC 125, as disclosed herein, is distinctly configured to solely employ regenerative braking while cruise control is activated. Thus, while in cruise control, if a condition arises that requires vehicle 120 to decelerate (or slow down), the DRCC 125 does not have to switch over to mechanical braking in order to slow down the vehicle. As alluded to above, FIG. 1 illustrates that the DRCC 125 includes a variable energy regeneration cruise control controller 126, which preforms the functions associated with the variable energy regeneration aspects for the DRCC 125. The variable energy regeneration cruise control controller 126 is configured to adjust an amount of energy regeneration that is allowed, effectively increasing the standard threshold of energy regeneration to a new temporary threshold while in cruise control mode. In the embodiments, the variable energy regeneration cruise control controller 126 is particularly configured to calculate a temporary threshold of energy regeneration that is employed by the cruise control system of vehicle 120, namely the DRCC 125, for extended regenerative braking while cruise control is activated. The temporary threshold of energy regeneration can be considered a dynamic adjustment, typically an increase, of a hybrid vehicle's standard threshold of energy regeneration, where the temporary threshold of energy regeneration is only applied temporarily by the vehicle, while operating in cruise control mode. For example, the variable energy regeneration cruise control controller 126 can calculate the temporary threshold of energy regeneration using the mathematical equation below:

$$\text{temporary threshold of energy regeneration} = x + \alpha \text{ [kW]} \quad (1)$$

Accordingly, by increasing the standard threshold of energy regeneration to the temporary threshold of energy regeneration, the amount of energy that is captured from regenerative braking in cruise control is also increased in manner that further improves the vehicle's efficiency and fuel economy. The variable energy regeneration cruise control controller 126 calculates the temporary threshold of energy regeneration such that mechanical braking and its energy loss is essentially eliminated. In other words, the variable energy regeneration cruise control controller 126 ensures that the temporary threshold of energy regeneration achieves the desired amount of deceleration using regenerative braking during cruise control.

Referring back to the vehicle-to-vehicle distance control example, the DRCC 125 may need to automatically slow down (shown in FIG. 1 as "slow down") the vehicle 120 to maintain the preset vehicle-to-vehicle distance away from lead vehicle 101A. Since the vehicle 120 is in cruise control mode, the temporary threshold of energy regeneration calculated by the variable energy regeneration cruise control controller 126 is applied by the DRCC 125 such that regenerative braking is used to decelerate vehicle 120 sufficiently to stay 80 feet away, for example, from lead vehicle 101A. That is, the variable energy regeneration cruise control controller 126 can adjust the amount of energy generation that is allowed by the vehicle 120 to an amount that ensures: 1) enough regenerative braking is utilized to slow down the vehicle 120 to the desired speed, and 2) the threshold is not reached while slowing down which would cause the DRCC 125 to switch over from regenerative braking to engage the mechanical brakes. Accordingly, the DRCC 125 can trigger a regenerative braking system 127 of the vehicle 120 to activate. For example, regenerative braking system 127 can slow down the vehicle 120 by transferring kinetic energy of motion into stored energy in a manner that slow the vehicle 120 down, causing deceleration. Furthermore, as alluded to above, an amount of stored energy may be increased resulting from the increased regenerative braking. That is, in response to the variable energy regeneration cruise control controller 126 increasing the amount of energy regeneration that a vehicle can employ, a high-voltage (HV) battery (typically used by hybrid vehicles) can continue past the standard threshold of energy regeneration, and keep storing the additional energy until the new temporary threshold of energy regeneration is reached. Thus, while decelerating, the DRCC 125 causes a larger amount of captured energy 128 from regenerative braking to be stored by the vehicle's 120 HV battery for later use. The DRCC 125 and the variable energy regeneration cruise control controller 126 allow most deceleration events to be covered by regeneration, thereby increasing the captured energy 128 of a HV battery, and therefore increasing overall fuel economy as well as improving drivability (e.g., less need to blend regeneration and friction brakes) and extend mechanical friction brake life.

In some embodiments, the variable regeneration energy cruise control features are implemented as an operational mode for vehicle 120. That is, a driver of vehicle 120 may be able to selectively activate or deactivate the cruise control implemented by the DRCC 125 (including the variable energy regeneration cruise control controller 126) as desired. For the purposes of discussion, vehicle 120 is described in reference to FIG. 1 having the cruise control mode activated, thereby enabling it to perform the variable energy regeneration cruise control techniques. Additionally, according to an embodiment, vehicle 120 can be an autonomous vehicle. As used herein, "autonomous vehicle" means a vehicle that configured to operate in an autonomous operational mode. "Autonomous operational mode" means that one or more computing systems of the vehicle 120 are used to navigate and/or maneuver the vehicle along a travel route with a level of input from a human driver which varies with the operational mode. As such, vehicle 120 can have a plurality of autonomous operational modes, including a cruise control mode responding to the DRCC 125 with a varied level of automated response. In some embodiments, the vehicle 120 can have an unmonitored autonomous operational mode. "Unmonitored autonomous operational mode" means that one or more computing systems are used to maneuver the vehicle along a travel route fully autonomously, requiring no input or supervision required from a human driver. Thus, as an unmonitored autonomous vehicle 120, response can be highly, or fully, automated. For example, the DRCC 125 can be configured to communicate controls so as to operate the vehicle 120 autonomously and safely. After the DRCC 125 communicates control to the vehicle 120 operating as an autonomous vehicle, the vehicle 120 can automatically perform the necessary adjustments (e.g., accelerating or decelerating) with no human driver interaction. Accordingly, in some cases, the vehicle 120 can operate with respect to the DRCC 125 and cruise control in a fully autonomous manner.

Alternatively, or in addition to the above-described modes, vehicle 120 can have one or more semi-autonomous operational modes. "Semi-autonomous operational mode" means that a portion of the navigation and/or maneuvering of the vehicle 120 along a travel route is performed by one or more computing systems, and a portion of the navigation and/or maneuvering of the vehicle 120 along a travel route is performed by a human driver. One example of a semi-autonomous operational mode is the aforementioned DRCC 125 system is activated for cruise control. In such case, the speed of a vehicle 120 can be automatically adjusted to maintain a safe distance from a vehicle ahead based on data received from on-board sensors, but the vehicle 120 is otherwise operated manually by a human driver. Upon receiving a driver input to alter the speed of the vehicle (e.g. by depressing the brake pedal to reduce the speed of the vehicle), the adaptive cruise control system is deactivated, and the speed of the vehicle is reduced. Thus, with vehicle 120 operating as a semi-autonomous vehicle, the variable energy regeneration techniques and response can be partially automated. In an example, the DRCC 125 communicates a newly generated (or updated) control to the vehicle 120 operating as a semi-autonomous vehicle, under cruise control features. The vehicle 120 can automatically perform the some of the necessary adjustments (e.g., accelerating) with no human driver interaction. Alternatively, the vehicle 120 may notify a driver that driver input is necessary in response to a new (or updated) safety control. For instance, upon detecting a safety violation, such as potential collision (e.g., close proximity to another vehicle 101A-101C), vehicle 120 may be reduce the speed to ensure that the driver is travelling cautiously. In response, vehicle 120 can present a notification in its dashboard display that reduced speed is required, because of the safety constraints. The notification allows time for the driver to press the brake pedal and decelerate the vehicle 120 to travel at a speed that is safe.

Figure 2:
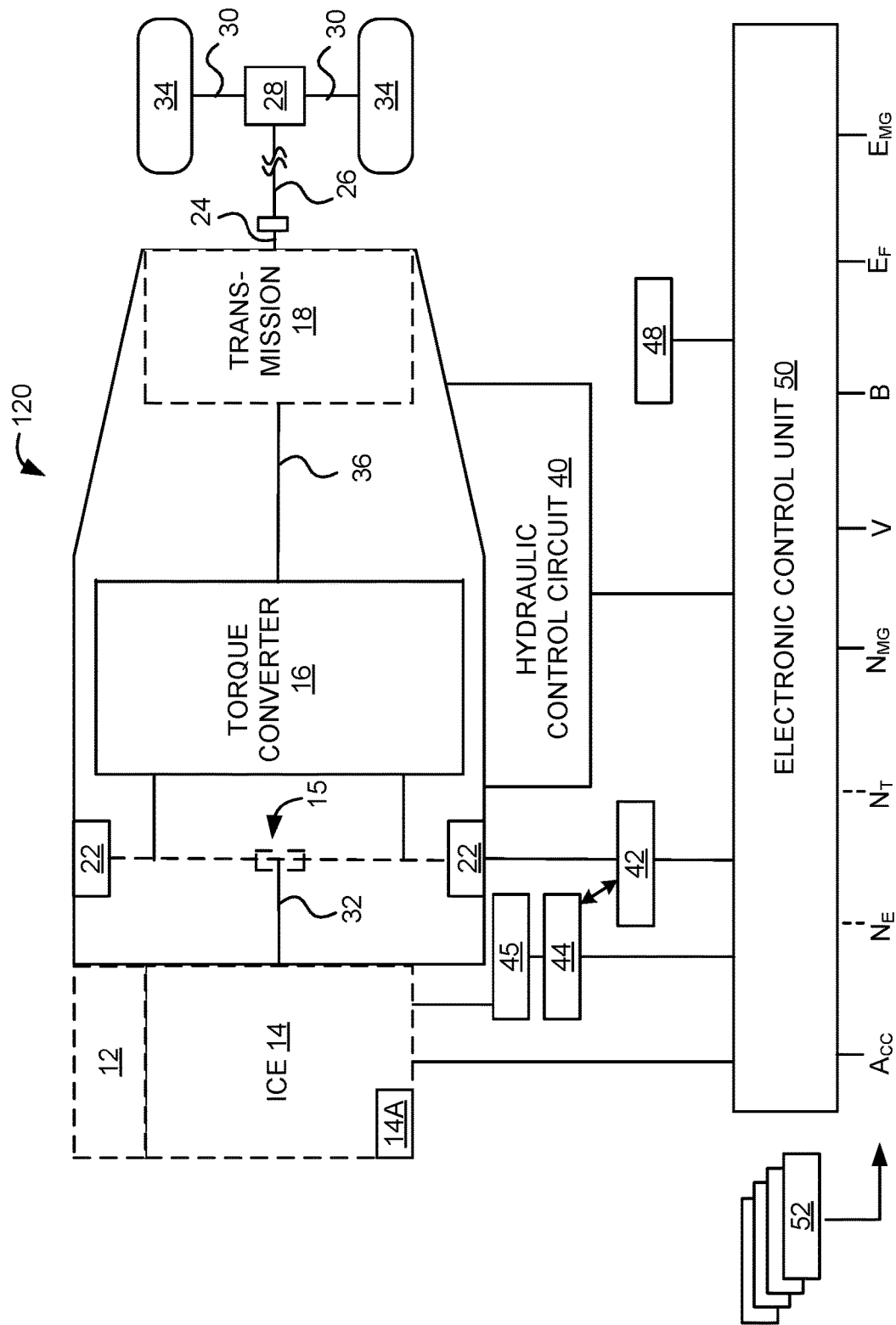
FIG. 2 is a schematic representation of an example vehicle with which embodiments of the variable energy regeneration cruise control systems and methods disclosed herein may be implemented.

An example vehicle in which embodiments of the disclosed technology may be implemented is illustrated in FIG. 2. Although the example described with reference to FIG. 2 is a type of vehicle, the systems and methods for variable energy regenerative cruise control can be implemented in other types of vehicle including gasoline- or diesel-powered vehicles, fuel-cell vehicles, electric vehicles, or other vehicles.

FIG. 2 illustrates a drive system of a vehicle 120 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

Vehicle 120 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be a hybrid electric vehicle (HEV) travel mode that uses engine 14 and the motor(s) 22 as the sources of motive power. In the engine-only and HEV travel modes, vehicle 120 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 120 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 120 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS, ESC, or regenerative braking system), battery management systems, and so on. These various control units can be implemented using two or more separate electronic control units or using a single electronic control unit.

In the example illustrated in FIG. 2, electronic control unit 50 receives information from a plurality of sensors included in vehicle 120. For example, electronic control unit 50 may receive signals that indicate vehicle operating conditions or characteristics, or signals that can be used to derive vehicle operating conditions or characteristics. These may include, but are not limited to accelerator operation amount, ACC, a revolution speed, NE, of internal combustion engine 14 (engine RPM), a rotational speed, NMG, of the motor 22 (motor rotational speed), and vehicle speed, NV. These may also include torque converter 16 output, NT (e.g., output amps indicative of motor output), brake operation amount/pressure, B, battery SOC (i.e., the charged amount for battery 44 detected by an SOC sensor). Accordingly, vehicle 120 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, EF, motor efficiency, EMG, hybrid (internal combustion engine 14+MG 12) efficiency, acceleration, ACC, etc.

Additionally, the one or more sensors 52 can be configured to detect, and/or sense position and orientation changes of the vehicle 120, such as, for example, based on inertial acceleration. In one or more arrangements, the electronic control unit 50 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, the electronic control unit 50 receives signals from a speedometer to determine a current speed of the vehicle 120.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Additionally, as alluded to above, the one or more sensors 52 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Figure 3:
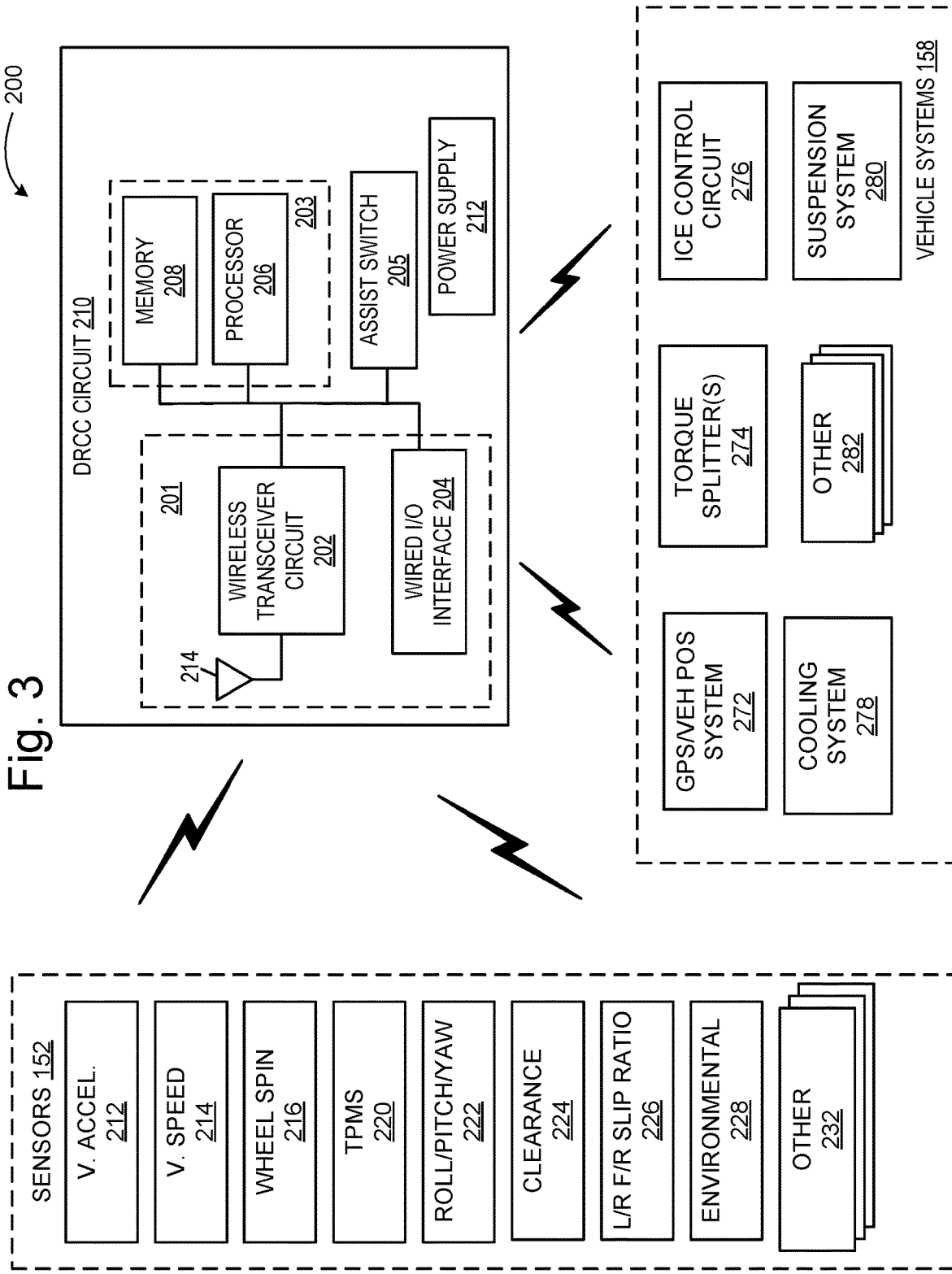
FIG. 3 illustrates an example hardware architecture for a variable energy regeneration cruise control in accordance with one embodiment of the systems and methods described herein.

Although the example of FIG. 3 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up the DRCC 210.

Communication circuit 201 either or both a wireless transceiver circuit 202 with an associated antenna 214 and a wired I/O interface 204 with an associated hardwired data port (not illustrated). As this example illustrates, communications with safety-aware AI circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by DRCC circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH2, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 2. Sensors 152 can include additional sensors that may or not otherwise be included on a standard vehicle with which the variable energy regeneration DRCC system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of variable energy regeneration DRCC system 200.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 they can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, and other vehicle systems.

During operation, cruise control circuit 210 can receive information from various vehicle sensors 152 to perform the aforementioned variable energy regeneration cruise control functions, for instance while the cruise control mode is enabled. Also, the driver may manually activate the cruise control mode by operating switch 205. Communication circuit 201 can be used to transmit and receive information between the cruise control circuit 210 and sensors 152, and cruise control circuit 210 and vehicle systems 158. Also, sensors 152 may communicate with vehicle systems 158 directly or indirectly (e.g., via communication circuit 201 or otherwise).

Figure 4:
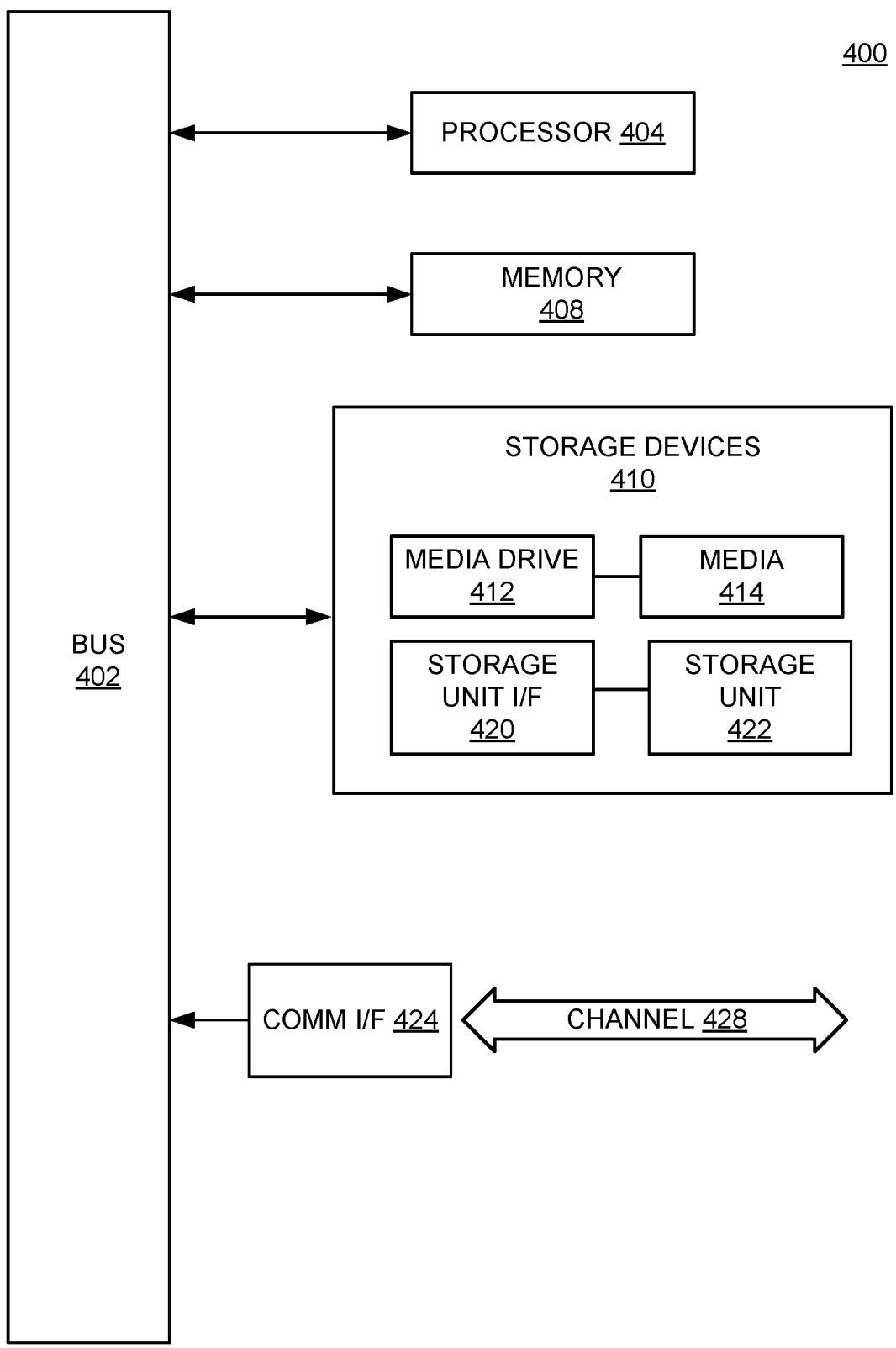
FIG. 4 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 4. Various embodiments are described in terms of this example-computing component 400. After reading this description, it will become apparent to a person skilled in the relevant art how to implement the application using other computing components or architectures.

Referring now to FIG. 4, computing component 400 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example, portable computing devices, and other electronic devices that might include some form of processing capability.

Computing component 400 might include, for example, one or more processors, controllers, control components, or other processing devices. This can include a processor 404. Processor 404 might be implemented using a general-purpose or special-purpose processing engine such as, for example, a microprocessor, controller, or other control logic. Processor 404 may be connected to a bus 402. However, any communication medium can be used to facilitate interaction with other components of computing component 400 or to communicate externally.

Computing component 400 might also include one or more memory components, simply referred to herein as main memory 408. For example, random access memory (RAM) or other dynamic memory, might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid-state drive, a magnetic tape drive, an optical drive, a compact disc (CD) or digital video disc (DVD) drive (R or RW), or other removable or fixed media drive might be provided. Storage media 414 might include, for example, a hard disk, an integrated circuit assembly, magnetic tape, cartridge, optical disk, a CD or DVD. Storage media 414 may be any other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot. Other examples may include a PCMCIA slot and card, and other fixed or removable storage units 422 and interfaces 420 that allow software and data to be transferred from storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 424 may be carried on signals, which can be electronic, electromagnetic (which includes optical) or other signals capable of being exchanged by a given communications interface 424. These signals might be provided to communications interface 424 via a channel 428. Channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:
a cruise control system programmed to:
dynamically adjust an amount of regenerative energy generated from decelerating a vehicle while a cruise control is activated by calculating the amount of regenerative energy captured from regenerative braking to eliminate switch over to mechanical braking and temporarily increasing the amount of regenerative energy generated for the vehicle above a standard threshold of energy regeneration to achieve a desired amount of deceleration without switch over to mechanical braking while the cruise control is activated, wherein the amount of regenerative energy is temporarily enabled while the cruise control is activated; and
a regenerative braking system decelerating the vehicle and storing an amount of captured energy based on the amount of regenerative energy.

2. The system of claim 1, further comprising a high-voltage (HV) battery storing the captured energy from decelerating the vehicle using the regenerative braking system and wherein the vehicle comprises a hybrid vehicle.

3. The system of claim 2, wherein the decelerating the vehicle using the regenerative braking system comprises transferring kinetic energy from a motion of the vehicle to the captured energy that is storable in the HV battery.

4. The system of claim 1, wherein temporarily increasing the amount of regenerative energy generated for the vehicle comprises setting a temporary threshold of energy regeneration that is employed by the cruise control system while cruise control is activated, wherein the temporary threshold is greater than the standard threshold.

5. The system of claim 4, wherein the cruise control system is further programmed to calculate the temporary threshold of energy regeneration by increasing a standard threshold of energy regeneration for the vehicle.

6. The system of claim 5, wherein the cruise control system is programmed to decelerate the vehicle using the regenerative braking system until the amount of captured energy reaches the temporary threshold of energy regeneration.

7. The system of claim 1, wherein the cruise control system comprises a dynamic radar cruise control system.

8. The system of claim 7, wherein the dynamic radar cruise control is programmed to automatically control the vehicle to maintain a preset vehicle-to-vehicle distance while the cruise control is activated.

9. The system of claim 7, wherein the dynamic radar cruise control is programmed to automatically control the vehicle to maintain a preset vehicle speed while the cruise control is activated.

10. The system of claim 9, wherein the dynamic radar cruise control is programmed to decelerate the vehicle using the regenerative braking system while maintaining the preset vehicle speed.

11. The system of claim 9, wherein the dynamic radar cruise control decelerates the vehicle using the regenerative braking system while maintaining the preset vehicle-to-vehicle distance.

12. The system of claim 1, wherein the amount of regenerative energy is calculated such that decelerating the vehicle is performed only by the regenerative braking system while the cruise control is activated.

* * * * *